United States Patent [19]

Shimose et al.

[11] 4,251,557
[45] Feb. 17, 1981

[54] ENCLOSED SYSTEM FOR A BATCH PROCESS FOR THE MANUFACTURE OF FISH MEAT

[75] Inventors: Takuma Shimose, Shimonoseki; Masato Tanaka, Ube, both of Japan

[73] Assignee: Shimose Shokuhin Co., Ltd., Yamaguchi, Japan

[21] Appl. No.: 48,235

[22] Filed: Jun. 13, 1979

[30] Foreign Application Priority Data

Jun. 12, 1978 [JP] Japan .................. 53-70616

[51] Int. Cl.$^3$ .............................................. A23C 12/02
[52] U.S. Cl. ..................................... 426/417; 426/486
[58] Field of Search ................ 426/486, 417, 454, 516

[56] References Cited

U.S. PATENT DOCUMENTS

| | | | |
|---|---|---|---|
| 2,497,367 | 2/1950 | Notevarp | 426/417 |
| 2,536,345 | 1/1951 | Bradford | 426/417 |
| 2,832,684 | 4/1958 | Sirnes | 426/417 |
| 2,972,542 | 2/1961 | Levin | 426/417 |
| 3,649,294 | 3/1972 | Thijssen | 426/417 |
| 4,137,335 | 1/1979 | Holm et al. | 426/417 |

*Primary Examiner*—Raymond N. Jones
*Assistant Examiner*—George C. Yeung
*Attorney, Agent, or Firm*—Fidelman, Wolffe & Waldron

[57] ABSTRACT

A batch process for making fish meal products, which does not pollute the environment, is described. All operations are conducted in equipment not open to the atmosphere and the liquids and gases produced are treated to remove odors. Fish is precooked in a cooker and the steam and vapors are conveyed to scrubbers where the foul-smelling gases are rendered innocuous. The pre-cooked fish meat in the cooker is pressed to removed press liquid which is treated to recover oil, fish meat and stickwater. The pressed fish meat in the cooker is then dried and removed as a product. The stickwater is evaporated under vacuum to recover dry water-soluble fish materials as a product and the overhead vapors are chemically treated to remove odors.

1 Claim, 12 Drawing Figures

ENCLOSED SYSTEM FOR A BATCH PROCESS FOR THE MANUFACTURE OF FISH MEAT

BACKGROUND OF INVENTION

The present invention relates to a fish meal manufacturing system. Fish meal is presently manufactured generally in the following manner:

Raw fish is fed from a hopper continuously in a limited quantity, and is cooked by steam in a cooker. Then, after separation of almost all boiled liquid the cooked material is pressed for the further separation of pressing water. Fish cake produced by press moisture removal is dried in a dryer, and is ground to produce fish meal. Boiled liquid and pressing water are mixed to produce a fluid (called press water), which is fed at a suitable temperature to a separator. The fluid mixture is separated into fish oil, fish solubles, and wet fish meal.

Prior-art processing systems are not of a closed type and the foul gases produced in such systems are discharged into the atmosphere at any point where a solid material must be carried to subsequent processing equipment. Furthermore, not much emphasis is placed upon cleaning-up of foul gases and polluted water. This results in severe environmental problems caused by offensive odors and water pollution in regions where plants under conventional systems are operated.

Still further, on existing processing systems, raw fish which can rapidly lose its freshness are continuously fed from a hopper in limited quantities. Such systems are not conducive to obtaining quality products. The quality of the various kinds of products cannot be kept consistantly high from the start to finish of the operation. Raw fish kept for a relatively long time for use at the end of the operation must naturally be less fresh. Thus products of poor quality, which may be even harmful, are quite commonly manufactured in conventional plants. However, this fact of lessened quality is not sufficiently recognized.

Generally, a cooker for boiling raw fish is a horizontal type cylindrical device which is slightly slanted and is enclosed with a steam jacket for heating the raw fish in the cooker. In the long cylindrical cooker a given quantity of fish material is pushed and moved therethrough at a constant speed, for example by means of a screw conveyer, which is provided inside the cooker. During this time the fish material is boiled in situ solely with the heat which is conducted through the steam jacket covering the cooker body, without any additional material, such as hot water, being added. The raw fish, upon completion of boiling, is discharged from the cooker so as to be fed to the next processor.

Boiling raw fish is a heat processing method in which the raw fish is heated in such a manner that substances constituting the fish body, particularly the fish meat, are contracted and water and fish oil contained therein are extracted. The fish meat is thus converted into a material which is easy to digest and is a good feed for animals.

In the case as described above, the fish body is boiled for a given period to extract relatively small quantities of hot water and fish oil. Boiling is continued in the extracted liquids, but the hot water present is insufficient to boil the entire fish body evenly and satisfactorily, and consequently the effect of boiling cannot be produced uniformly. In addition to this disadvantage, the fish body is formed in a layer, which is moved at a fixed speed in the cooker and is not stirred vigorously, as the cooker is not designed for such operation. As a result, the fish body within the core of the cooker cannot be heated as is the portion of the fish body which is held in contact with the inner wall surface of the cooker. In other words, a conventional cooker cannot be employed satisfactorily for evenly boiling the fish body or the fish meat feed material owing to defects in such boiling process and in the design of the cooker. Furthermore, it is noted that such a cooker is not based on the principle of boiling the entire fish body. Rather, emphasis in the prior art is placed on the in situ processing of raw fish with external heat applied to the fish body and on the theory and results of such heating.

SUMMARY OF INVENTION

The present invention is a result of our development in the technique for treating raw fish with heat, on the basis of a novel theory of heating which is essentially different from conventional concepts and is practically applicable. To overcome such disadvantages as described above, the invention provides a plant system for manufacturing fish products of good quality and high grade. The objects and features of the invention will be clear from what is described below.

In accordance with the invention:

(1) Raw fish are fed in a batch process system wherein all fish to be processed are fed at the same time into a high-pressure cooker while the fish are still fresh and of uniform quality. Our emphasis is placed upon the quality and consistency of the products, which are obtained from whole fish, fish meat, or by-products in fish processing plants.

Precooking raw fish in the high-pressure cooker is conducted quickly and thoroughly under proper conditions of high pressure and high temperature without sacrifice of quality. Thereafter, press moisture is removed from the precooked fish in the same cooker in the absence of high temperature conditions, and press water is discharged from the cooker.

The moisture-removed fish meat in the form of a cake is not conveyed to any other device, but is vacuum dried in the same cooker and is removed from the cooker as unfinished or intermediate products.

The press water which is discharged from the cooker is further processed for extraction of fish oil, and a stickwater is obtained which is concentrated by means of a vacuum evaporator and is dried by means of a viscous fluid dryer for producing a soluble fish powder.

(2) The design of the processing equipment is based on the principle of identical batch processing under identical conditions at the same time. Such processing equipment is operated as a totally closed system, and all processes other than precooking and press moisture removal are carried out under vacuum conditions, due consideration being given to material quality and optimum processing efficiency.

(3) From the view point of environmental protection and sanitation, the processing system of this invention is totally enclosed so that the foul-smelling gases present in the steam and the polluted water which result from the processing of raw fish in the system can be thoroughly cleaned with suitable chemical solutions and the use of chemical and physical procesing equipment. Thus, the processing system, in accordance with the invention, is most satisfactory for the purpose of environmental protection and sanitation.

BRIEF DESCRIPTION OF THE DRAWINGS

FIGS. 2A and 2B are sectional views of the steam manifolds.

DESCRIPTION OF THE PREFERRED EMBODIMENT

Figure 1:
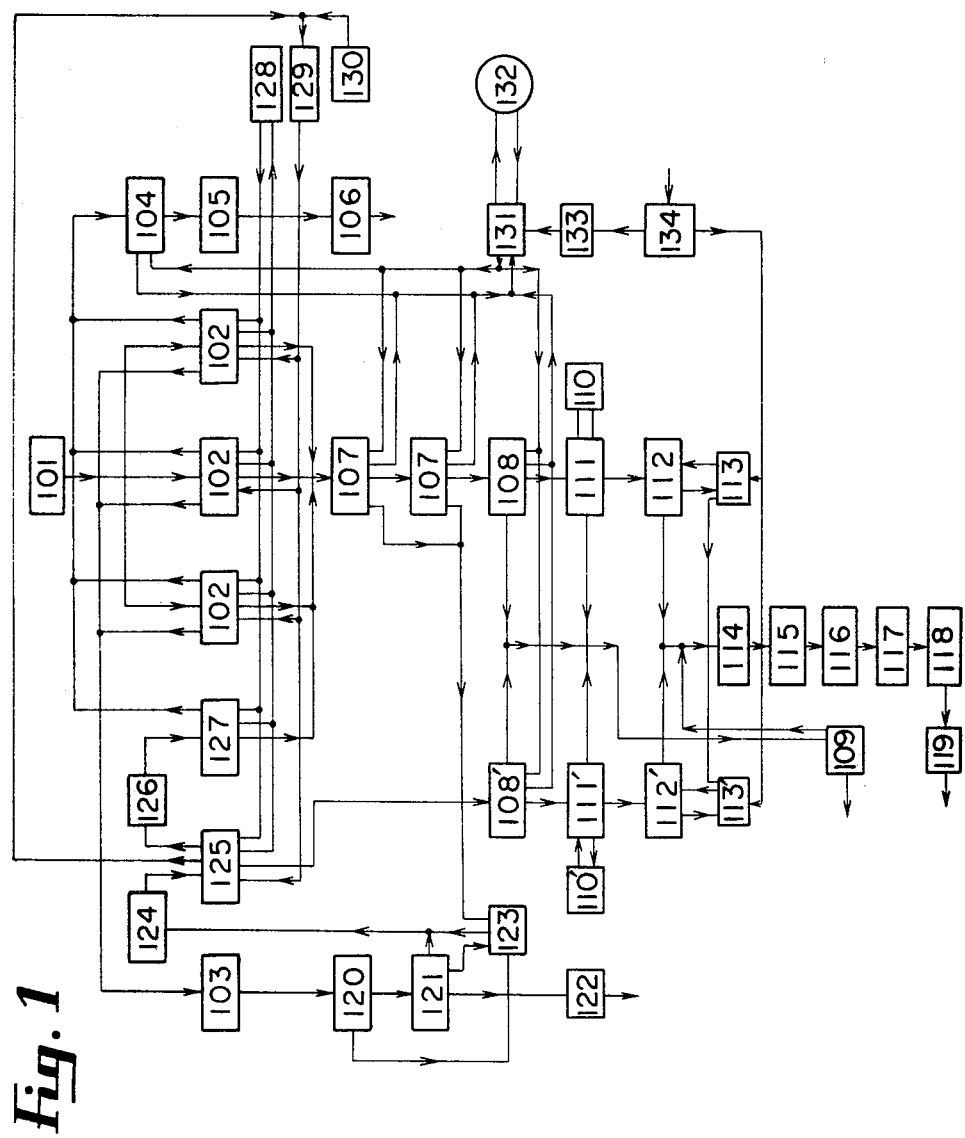
FIG. 1 is a flow chart of the invention.

Referring now to the drawing, the present invention wil be explained in detail.

(1) Precooking, Pressing, and Drying of Raw Fish

First, raw fish 101 is fed into a horizontal, cylindrical high-pressure cooker 102 as a unit batch of material, so as not to have any deterioration with time.

The high-pressure cooker 102 is capable of precooking, pressing and removing moisture from the material and then drying in a single chamber, the structure of which is shown in FIGS. 2 and 3A, 3B, and 3C.

Shown in the drawing is outer body or shell 1 of cooker 102 which has two chambers 3 and 3' formed by division with fixed press plates 2, 2 serving as partitions opposed at the center at a given distance, said two chambers 3 and 3' being connected to each other through a vent hole 4.

The fixed press plates 2, 2 have slits 5 for passing press water, (FIG. 3B) which are formed on the entire surface of each press plate.

Numerals 6, 6 represent jackets which cover the body 1 of the cooker 102, having a thermal or heat exchange medium. 7, 7 are inlets 8, 8 are outlets and 9, 9 are helical passages for the thermal medium. The thermal medium is circulated through a heater not shown, and is employed in a quantitative/qualitative manner so as to leave the outlets 8, 8 at a specific temperture $T_2$ (°C.) after heat transfer. Temperature $T_1$ (°C.) at the inlets is controlled in relation to the consumption of fuel for heating the thermal medium. In other words, fuel consumption is controlled for maintaining a constant temperture. The thermal medium is forced to circulate through the heating jackets by means of a pump (not shown).

At the bottom of the cooker 102, numerals 10 and 11 represent pipes for discharging press water, which are provided at the center of a chamber 12, and at the outer ends of the chambers 3 and 3' bounded by the fixed press plates 2, 2 and the ends of the cooker. These pipes have automatic control valves 13 for opening and closing. Numeral 14 represents ports for product discharge, which are provided at the inner ends of the chambers 3 and 3' respectively, and likewise have automatic control valves 15.

At the upper portion of the cooker 102, numeral 31 represents ports for charging raw fish. Pipes for discharging steam which may be produced in the cooking device 1 are shown at 16, each pipe having an exhaust pump (not shown) and an automatic control valve 17 for opening and closing operation. The pipe 16 has a branch pipe 19, having an automatic control valve 18, which is provided for bleeding the cooker to prevent the danger of a sudden blow of high-pressure steam.

In the lower part of the cooker 102, numeral 20 represents jet holes of high-temperature high-pressure steam for precooking operation and 21 represents smaller jet holes of high-pressure steam for breaking and crushing the fish material. As schematically shown in FIGS. 2A and 2B, the steam for these operations is delivered to cooker 102 by means of manifolds 20a and 21a, which have associated valves and the like, known to the art. The fish material, which is wet with press water not yet fully removed as is required, is partly compressed between the press plates and is hardly compressed any more than halfway in the pressing process in the cooker. The smaller jet holes 21 are provided for permitting further pressing of the fish material held between the moving press plate 28 and the fixed plate 2 by breaking and crushing it with high-pressure steam.

Figure 2:
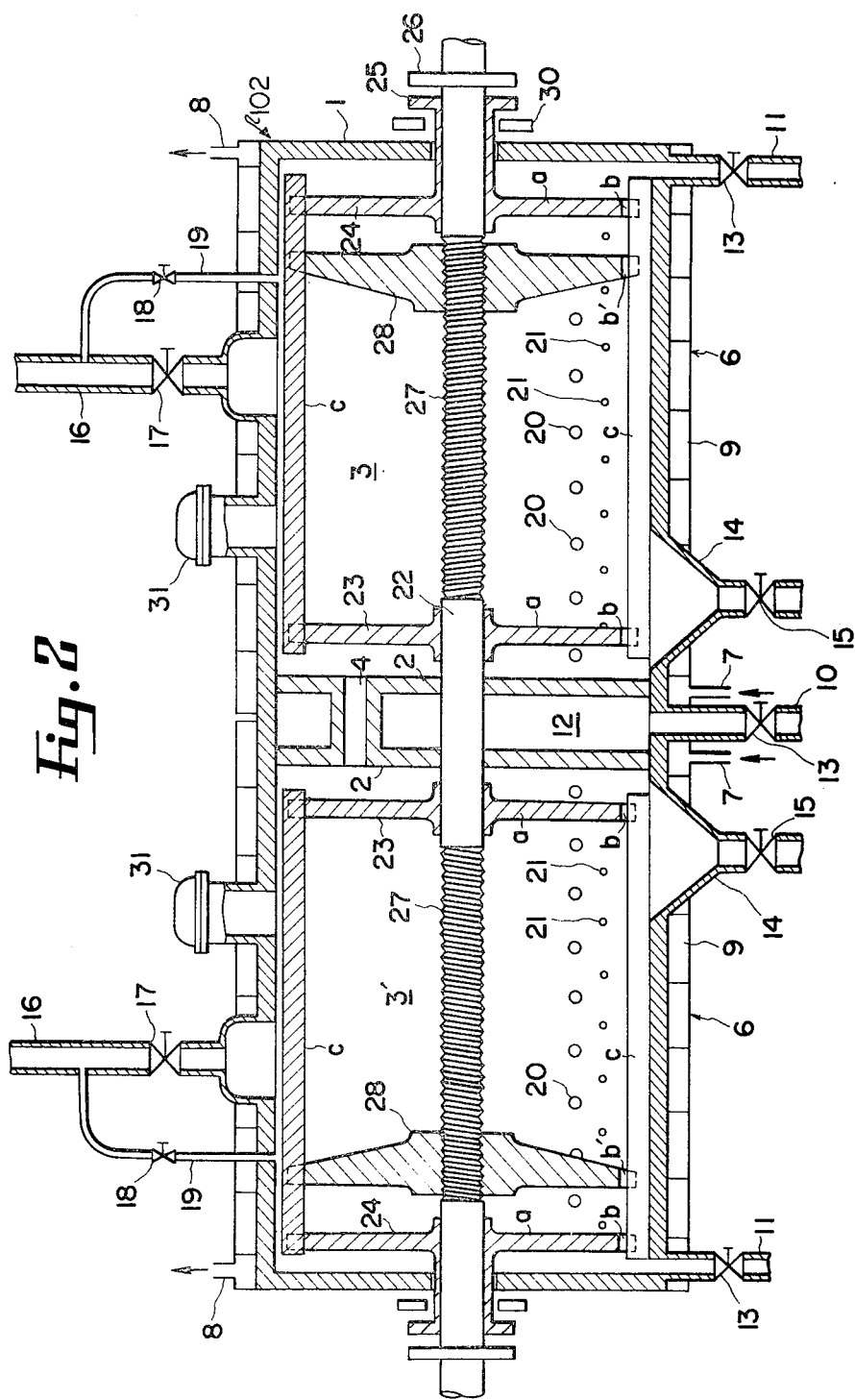
FIG. 2 is a vertical section view of a horizontal cylindrical high-pressure cooker of the invention, omitting the steam manifolds.
Figure 3:
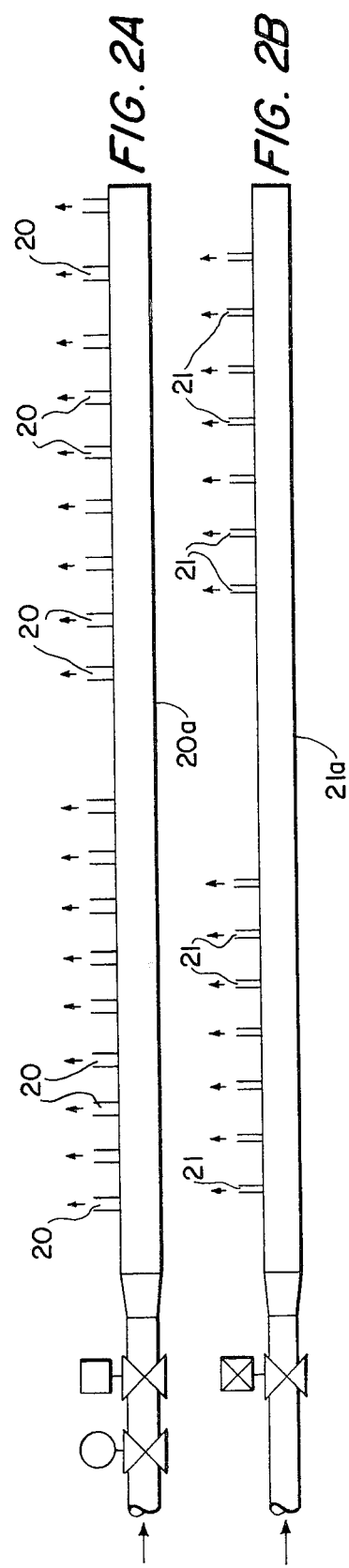
FIG. 3A, 3B, and 3C are views of various main portions of the cooker.

Numeral 22 represents a rotary driving shaft mounted through the cooker 102. This is a single shaft passing through the two chambers 3 and 3' as indicated in the drawing (FIG. 2). Numerals 23 and 24 represent rotary vane members mounted on the rotary driving shaft 22 at the inner and outer ends of the chambers 3 and 3'. A vane arm (a) (FIG. 3B) has a receiving recess (b) at the end into which a bar-like stirring member (c) is inserted loosely.

The stirring member (c), as will be described later, is pushed and moved as the rotary vane members 24 rotate, sliding on the inside wall of the cooker and forced against it by centrifugal force. Such sliding results in positive separation of the material being stirred from the inside wall of the cooker 102.

Bosses of rotary vane members 24 extend outside the cooker 1 and have clutch plates 25 at the outer ends. Clutch 26 is mounted integrally on the rotary driving shaft 22 facing the clutch plate 25. When the clutch plates are engaged, the rotary power of the driving shaft 22 is transmitted to the rotary vane members 24, and causes the stirring member (c) to slide against the inside wall of the cooker 102, while the other rotary vane members 23 which are not fixed to the shaft 22 are driven by the moving stirring member (c). Numeral 27 represents square-thread screw portions formed on the driving shaft 22 and 28 represents moving press plates mounted thereon.

Each moving press plate 28 has slits 29 formed on the entire surface for discharging press water. Receiving recesses (b) (FIG. 3B) are formed at specific points on the periphery into which the stirring members (c) are inserted loosely. Thus, when the clutches are not engaged, the moving press plate 28 is moved back and forth along the square-thread screw portions 27 as the driving shaft 22 is caused to rotate clockwise and counterclockwise. During engagement of the clutches, the press plate 28 are turned by means of the stirring members (c) without being moved along the driving shaft 22, similar to the rotary vane members 23 which cannot travel along the shaft.

In the cooker 102, as shown in the drawing the square-thread screw portions 27 are formed in symmetry as right and lefthand threads, and concomitantly the plates 28 are moved symmetrically in the chambers 3 and 3'. Numeral 30 represents a brake for stopping the rotary vane members 24.

Operation of the plant will be explained in the order of processing.

(A) Precooking

Raw fish are fed through charging holes 31 up to about 60% of full charge and are precooked in a short time under high pressure which is produced by thermal medium supplied through the jackets 6 and by high-temperature high-pressure steam supplied from the jet holes 20, with the stirring members (c) sliding along the inner walls of 1 during engagement of the clutch plates 25 and 26.

During this time, pipes 10 and 11 for discharging press water, ports 14 for product discharge, charging holes 31, and pipes 16 and 19 are all closed. In other words, precooking is done under high pressure. The two chambers 3 and 3' are automatically controlled for identical pressure through the vent hole 4 connecting the two chambers.

Raw fish is piled evenly on the bottom of the cooker when fed in by operating the stirring members (c) so as to slide in short movements on the inside wall. In this process the moving press plates 28 are kept in their back position, as readily understood.

When the pressure controlled within the cooker 1 reaches 3 kg/cm.$^2$G, the temperature of all of the material therein becomes 143° C. The precooking of the material is completed under this pressure when this temperature has been reached by continuing the heating for a given period. In this process, almost all of fats and water soluble substances contained in the fish material can be extracted in hot water. The heating period may vary as deemed necessary, but thirty minutes is suitable. One way in which the completion of the precooking step is indicated is by the tenmperature of the thermal medium discharged, i.e., 140° C., which is as high as the temperature when it is introduced into the jackets 6.

(B) Pressing and Removing Moisture

Pressure in the cooker 102 is reduced after stopping the rotation of the driving shaft 22 and disengaging clutch plate 25 from clutch plate 26. In other words, the control valve 17 in the pipe 16 is opened for discharging steam which is produced in cooker 1 after the opening of the control valve 18 in the pipe 19 for reducing steam pressure.

When pressure in the cooker 102 has been reduced, the press plates 28 are moved inward by turning the driving shaft 22 for pressing fully precooked fish therebetween. Press water thus produced is discharged from the pipes 10 and 11 through the slits 29 and 5 to the outside of the processing system. For draining such water it is preferable to install the cooker 102 somewhat at a slant.

It is rather difficult to remove moisture from a mass of precooked fish material so that any desired moisture content is evenly distributed therein just by the pressing operation of the inward movement of the press plates 28. This is because the material tends to accumulate to a relatively low height and to become aggregated on the bottom of the cooker. Nevertheless, moisture can be removed evenly and moisture content as desired can be obtained by the method described below.

After the pressing operation, as set forth above, stirring by means of the stirring members (c) is started by engagement of the clutch plates 25 and 26, while high-pressure steam for breaking and crushing the material is supplied from the jet holes 21 for making the stirring operation more effective. As a result, the semi-solid material held between the moving press plates 28 in the inward position and the fixed press plates 2 is broken and crushed and is piled up to a greater height; and the volume of the material is increased. The high-pressure steam jets are then cut off, and stirring operation is stopped by disengagement of the clutch plates. The material is thereafter pressed again more tightly.

By repeating the above operation, moisture can be removed without difficulty from the material so that any desired moisture content may be evenly maintained therein. For this purpose, high-pressure steam jets are so controlled as to be supplied only at the inner side of the cooking device 1 because no use is made of the steam jets at the outer side.

(C) Drying

When press moisture removal is finished as desired, the moving press plates 28 are moved back to the original outer position. Then, the material is dried with heat which is conducted from the thermal medium in the jackets 6 under stirring operation with the clutch plates 25 and 26 engaged. During this time the automatic control valves 17 and 18 are kept open. The drying step is carried out under reduced pressure and steam generated in the cooker 102 at this stage is drawn out by vacuum through the pipes 16.

(D) Discharge

When drying is completed to the degree desired, the stirring operation is stopped, and the ports 14 for product discharge are opened with the automatic control valves 17 and 18 is kept open. The material is pushed and wiped down to the ports 14 by moving the press plates 28 to their innermost positions.

Upon completion of precooking operation, the valves 13 are opened, and (referring to the flow chart of FIG. 1) press water is fed to a press water tank 103 by means of a pump. Pressing water produced by further press moisture removal is discharged into the same tank 103. The product (solid portion) delivered from the cooker 102 is made odorless during the process of press moisture removal which is conducted in a vacuum, and is fed to product cooler 104, grinder 105, and product silo 106 as in conventional processes.

Treatment of steam discharged under vacuum will be described below. In the system of the invention, all passages of gas and liquid are through pipe members, which serve as closed feed lines.

The processing of gas and liquid constituents which are discharged from the cooker 102 will now be described.

(2) Steam Productced in the Cooker 102 and Discharged in the Drying Process

The steam processing system for such steam is shown as a series of equipment subsequent to the cooker 102 in FIG. 1, comprising two cyclone steam condensers provided in series, a plate condenser, an uncondensable gas cooler, and a water jet ejector which operates to keep the system up to the cooker 102 in a vacuum of about 100 Torr.

The steam processing system will now be described in detail.

Steam of offensive odor which is discharged from the cooker 102 contains ammonia $NH_3$, hydrogen sulfide H₂S, many other kinds of gases, and fish particles which are wet and small in quantity. If such steam is processed in a conventional dry-type cyclone device, some of the dried fish particles will become stuck to the inside wall. Fish particles, thus caught, will deteriorate with atmospheric steam and hydrogen sulfide into a wet viscous substance which can grow thicker and thicker on the inside wall until some malfunction is caused in the operation thereby.

Figure 4:
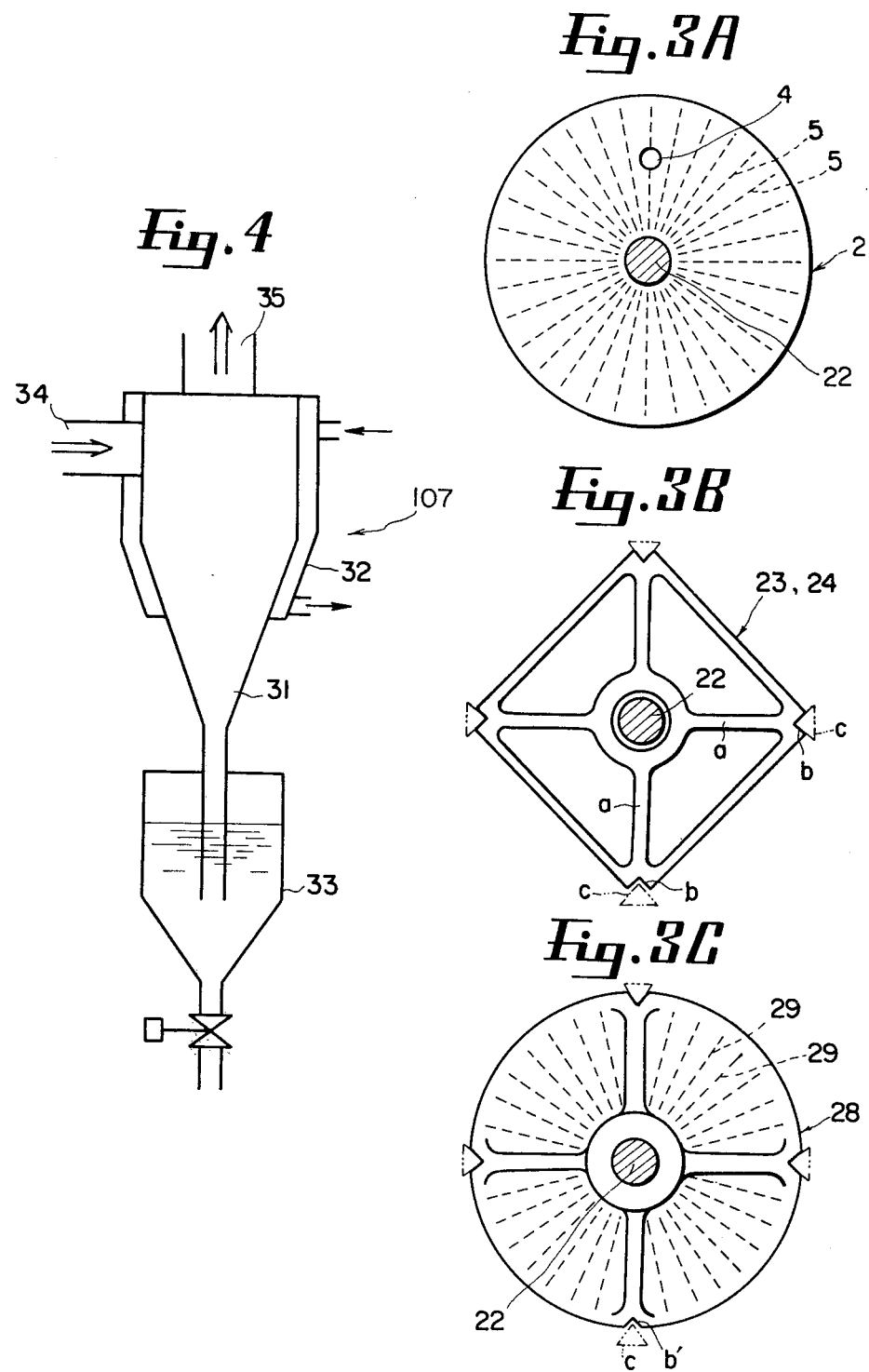
FIG. 4 is a schematic longitudinal sectional view of a cyclone steam condenser of the invention.

In accordance with the invention, such problems are avoided by use of a specially developed cyclone steam condenser. The cyclone steam condenser 107 of this special design is shown in FIG. 4.

In the drawing, 31 represents a condenser body, 32 a cooling water jacket provided externally and around the body 31, 33 a condensed water collector of a closed type, 34 a steam inlet, and 35 an outlet for steam discharge.

The wall of the condenser body, with which incoming steam is brought into contact, is kept cooled all the time; and part of the steam must touch the inside wall of the condenser 31 during its spiral motion therein. Consequently such steam is cooled and is condensed continuously into water, which flows together on the wall down to the collector 33 and is stored therein.

On the other hand, fish particles mixed in the steam, which may also touch the inside wall, are caught on the film of water which is formed thereon and flows down slowly. They are carried down into the collector 33 together with filmy water without adhesion to the wall surface. Thus, the processing system described is trouble-free in operation, which may be otherwise in the prior art dry type cyclone devices, as previously indicated.

In accordance with the present invention two condensers of this type are provided in series for more effective operation. Condensed water containing fish particles, which is stored in the collector 33, is mixed with aqueous fish solubles, and this mixture is fed to a cushion tank 123 to be described later.

Bad-smelling steam discharged from the condenser 107 is then introduced into a conventional plate condenser 108, where all of such steam is cooled and condensed into water with cooling water by heat exchange on the wall of the condenser. Such condensed water is stored for collection in a closed tank 109 which is installed about 11 meters below the condenser, sufficiently lower to prevent reverse flow by vacuum force. Uncondensable gases consisting of air as a main component, ammonia, hydrogen sulfide, and other gases of foul odor are discharged from the plate condenser 108 into which odorous steam containing such gases are introduced.

Processing in the plate condenser 108 is carried out in a vacuum of about 100 Torr, and accordingly the temperature of steam when introduced therein is about 50° C. This means that the temperature of condensed water and uncondensable gases which are discharged from the plate condenser 108 is about 50° C. If such uncondensable gases are fed directly to a water jet ejector 112, the temperature of circulating water employed for gas absorption may be elevated with the result of not only decreasing in the efficiency of the ejector but also producing repugnant odors from such water as the temperature rises.

To prevent this occurrence, a fluorinated hydrocarbon gas (Freon) supplied from a freezer 110 is fed to an uncondensable gas cooler 111 so as to reduce the temperature of uncondensable gases to about 15° C., which is a little lower than a normal water temperature before the supply of such gases to the water jet ejector 112. The freezer 110 and the gas cooler 111, which are conventional, are not shown in detail. Condensed water produced here is conveyed to tank 109 for collection and storage.

As already described, the processing system down to the water jet ejector 112 is kept in a vacuum of about 100 Torr. Ejector 112 is employed and not a vacuum pump because of higher performance, greater capacity, better reliability and safety in operation. The ejector is also capable of purifying gases.

In the drawing, 113 represents a seal tank of circulating water, which is employed by the water jet ejector 112. This tank is conventional and is not shown schematically. Foul-smelling gases which are discharged from the water jet ejector 112 and comprise air as a main component are then introduced into gas cleaning equipment described below. Similarly introduced are the gases which are stored in the seal tanks 113 and 113' and in condensed water collecting tank 106.

The gas cleaning equipment employed was developed specially for securing full and positive effects through sufficient contact by mixing the offensive gases with chemical agents. The gas cleaning equipment shown in FIG. 5 consist of three water jet ejectors 114, 115, and 116 provided in series, ion exchanger 117, actived carbon gas absorber 118, and blower 119 for exhausting the gases which are now made odorless and harmless in the cleaning process.

In the three water jet ejectors 114, 115, and 116 solutions of 5% $H_2SO_4$, 10% NaOH, and 4% NaClO respectively, are employed and circulated in nearly equal amounts. Individual components of the offensive gases are removed by gas-liquid contact with high efficiency when passing through such solutions in the water jet ejectors. After completion of the operation, all water after processing is fed into an industrial water tank.

(3) Press Water and Pressing Water Collected from the Cooker 102 led into the Press Water Tank 103

The temperature of such water is controlled properly in the press water tank, as already described, and is fed to an oil-separator self-cleaning unit 121 through a self-cleaning strainer 120, where the water is separated into fish oil, recovered meal, and stickwater. Fish oil is fed to a fish oil tank 122, and is processed into products. Recovered meal is fed to a cushion tank 123, to which is additionally fed a small quantity of fish meat grounds discharged from the self-cleaning strainer 120. Condensed water containing fish particles from the cyclone steam condenser 107, as described above, it also fed into the cushion tank.

The aquatic solution in the cushion tank 123 is supplied to a stickwater tank 124, together with stickwater recovered meal which is discharged from the oil-separator self-cleaning unit 121. The self-cleaning strainer 120 and the oil-separator self-cleaning unit 121 are conventional, and are not shown schematically.

Stickwater is fed to a vacuum evaporator 125 to be concentrated. The vacuum evaporator 125 is shown schematically in FIG. 6, where 36 represents the body which consists of the lower heating part and the upper part for receiving stickwater, 37 and 38 are, respectively, valves for discharging concentrated liqud and steam generated in the body, and 39 is a valve for charging stickwater to the evaporator.

Figure 6:
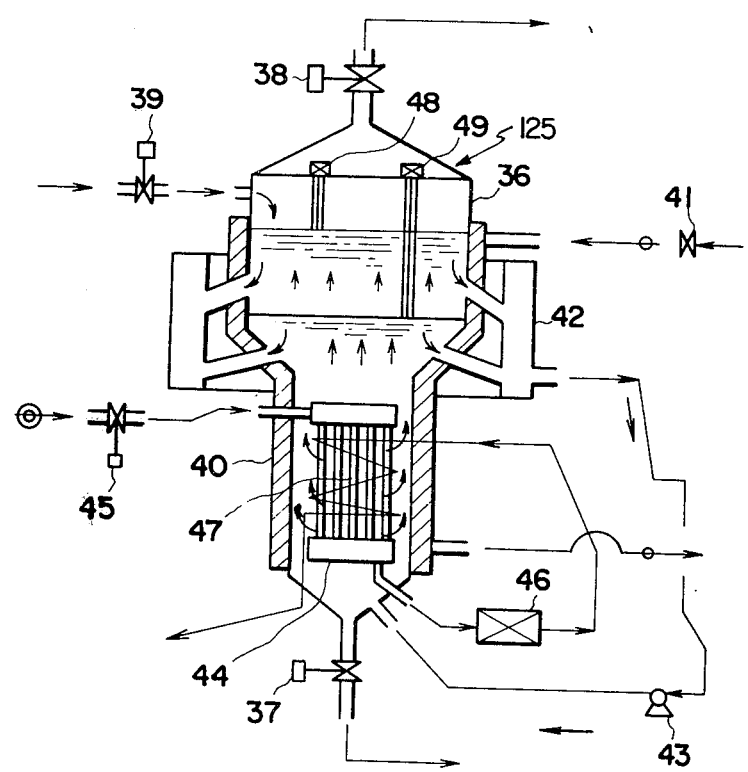
FIG. 6 is a schematic longitudinal sectional view of a vacuum evaporator of the invention.

Numeral 40 represents a thermal-medium heating jacket which surrounds the outside of the body 36, 41 a valve for supplying thermal medium, 42 a circulation chamber receiving liquid in the upper part of body 36 and 43 a pump for forced circulation of the liquid through the chamber and the lower part of the body as shown in FIG. 6. Number 44 represents a steam heater which is mounted in the lower part of the body 36, 45 a valve for supplying steam as a heat source, 46 a drain cock, and 47 a pipe for heating hot-water drain. Numeral 48 represents a level gauge for checking the upper level of a full charge of stickwater, and is hung in the upper part of body 31. 49 represents a level gauge for checking the bottom limit of the stickwater to be processed.

The operation of vacuum evaporator 125 will now be described.

By opening the valve 39, stickwater is charged by means of a pump until the pump is stopped when a given charge of liquid has been indicated by the level gauge 48. During this time the operation of the water jet ejectors is suspended with the valves 38 opened and the valves 45 and 41 closed. When the charging of the liquid is finished, the valve 39 is closed.

Then, after the start of operation of all water jet ejectors 112, 112', 114, 115, 116 connected thereto, concentration starts when the valves 45 and 41 are opened, and the liquid in the lower part of the body is forced to circulate by help of the pump 43. Steam generated in the body of the vacuum evaporator is discharged from the valve 38 by vacuum force, which is produced by a water jet ejector as described above. In other words, such steam is processed in the same manner as in the bad-smelling steam discharged from the condenser 107. The vacuum is generated by the water jet ejector 112' through an uncondensable gas cooler 111', where florinated hydrocarbon gas supplied from a freezer 110' is circulated.

Figure 5:
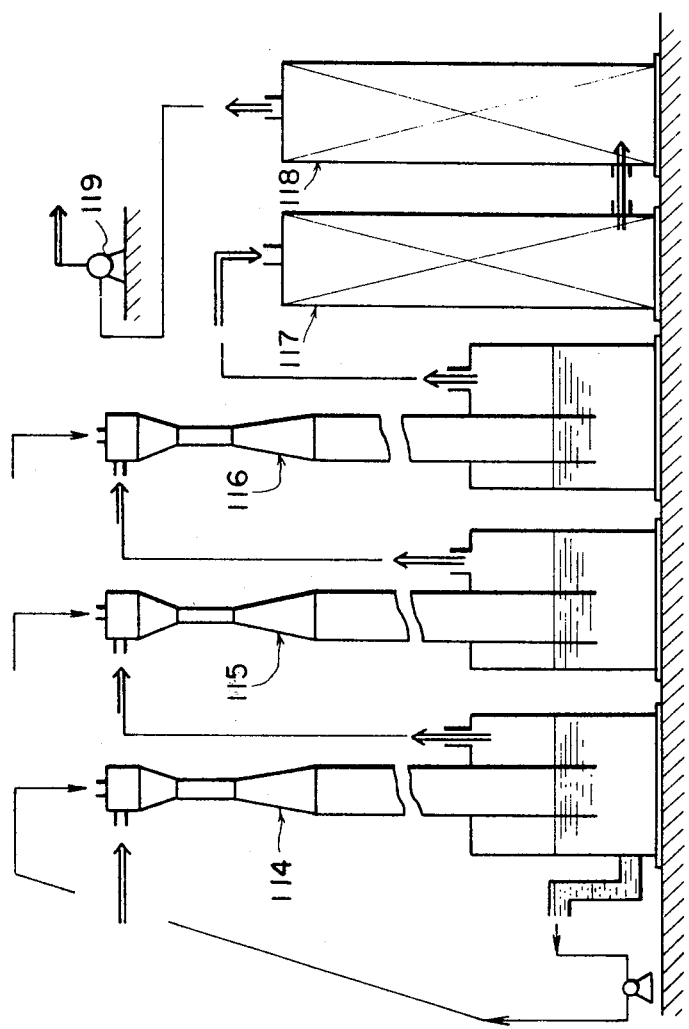
FIG. 5 is a schematic view of gas cleaning equipment of the invention.

Gases of offensive smells, which are discharged from the water jet ejector 112' are stored in a seal tank 113' and thereafter are fed to the gas cleaning equipment of FIG. 5, previously described. Condensed water produced in a plate condenser 108' and in the uncondensable gas cooler 111' is likewise collected in the tank 109.

Upon completion of concentration, the volume of the liquid thus processed is reduced; and consequently, the liquid level goes down to a preset level. When this level has been sensed by the level gauge 49, the valves 45 and 41 are closed, and the pump 43 stops its operation. Then, the water jet ejector 112' for generating vacuum suction stops its operation likewise, and thereafter valve 37 is opened for feeding all concentrated liquid to a tank 126 therefor. At this time, the vacuum evaporator 125 is ready for the next charge of stickwater.

The concentrated liquid is then fed to a viscous fluid dryer 127, which was developed for this purpose.

Figure 7:
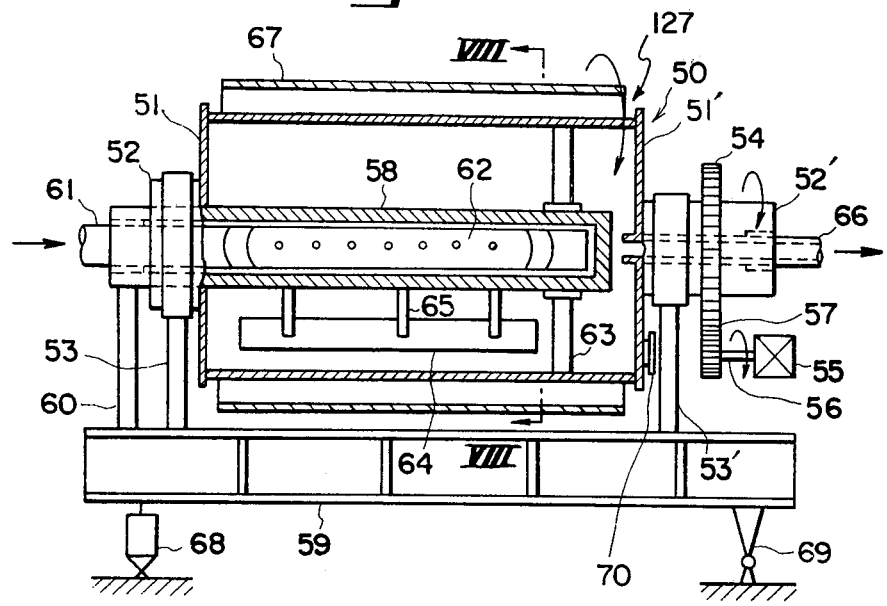
FIGS. 7 and 8 are front and side longitudinal sectional view of a viscous fluid dryer.
Figure 8:
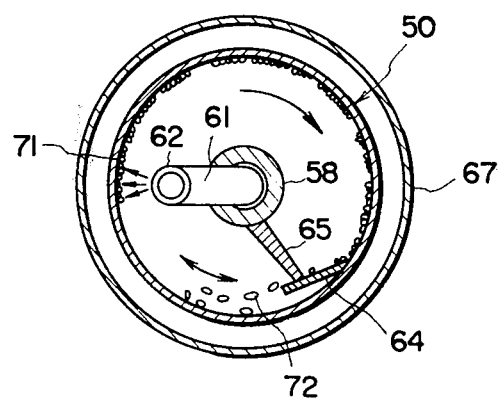

The viscous fluid dryer 127 will be described with reference to FIGS. 7 and 8, where 50 represents a closed, horizontal drum, which is driven to rotate and has hollow shafts 52 and 52' mounted on covers 51 and 51' which serve to close both ends of drum 50. The drum thus constructed is supported on bearing members 53 and 53' with a gear 54 mounted on the hollow shaft 52', which is engaged with a gear 57 mounted on a driving shaft 56 connected to a driving source 55.

In the center of the drum 50 is inserted a cylindrical pipe frame 58 extending outside the drum which is supported fixedly on a supporting frame 60 mounted on the base 59 on which the bearing members 53 and 53' are likewise mounted. The cylindrical pipe frame 58, through which a pipe 61 for introducing a fluid to be processed is provided, cannot follow the rotation of the drum 50. The pipe 61 is bent horizontally inside the drum 50 to protrude from cylindrical pipe frame 58, as shown in FIGS. 7 and 8; and a fluid jet portion 62 is formed which has a number of jet holes.

Numeral 63 represents a bearing stand mounted on the inside wall of the drum 50 for rotatably receiving the inner end of the cylindrical pipe frame 58, 64 is a scraper fixed at the end of arms 65 which extend from the frame 58, and 66 is a pipe for discharging steam and foul-smelling gases generated in the drum. The pipe 66 is connected at other end to the inlet of cyclone steam condenser 107, as the volume and nature of such gases are found almost identical with those which are discharged from the horizontal, cylindrical cooker 102 previously discussed. Numeral 67 represents a thermal-medium jacket enclosing the drum 50, reference numerals 68 and 69 represent, respectively, a jack and a pin receiver which are provided at both ends on the bottom of the base 59, and 70 represents a product discharge port.

With the arrangement of the system of the invention as described heretofore, the fluid to be processed is fed through the pipe 61, and is sprayed through jet holes in the fluid jet portion 62 against the inside wall of the rotating, heated drum 50. As water is evaporated, a thin layer of water 71 is formed on the wall and fish particles contained in the water layer are dried as the heated drum rotates. Dried fish particles are scraped away from the wall by means of the scraper 64, forming flakes 72, which fall onto the bottom of the drum 50. Such flakes are moved back and forth and tumbled up and down, until they are completely dried.

Meanwhile, steam and gases produced in the drum are discharged as they are generated to the outside of the processing system under vacuum. As the drying process is conducted in a vacuum, constituents of a fish fluid can be kept fresh and drying can be attained with high efficiency with the simultaneous discharge of foul-smelling gases.

In this manner, a mass of flakes 72 produced and held in the drum is made odorless and is dried to the extent required. After the driving motor is stopped at a proper time, and vacuum suction is cut off by closing the valve connected to the cyclone steam condensor 107, the base 59 is inclined by operating a jack 68 so that the dried flakes 72 may be delivered through a product discharge port 70.

The mass of flakes thus discharged, which is dry soluble fish material, is used directly as a product of the process after being passed through a cooler and a grinder.

In the drawing, a solid material which is discharged from the cooker 102 is fed to the cooler 104 and the grinder 105. However, the soluble fish and material produced in 127 is different in its properties from the solid fish material, produced in cooker 102 and may therefore be processed through a separate cooler and grinder (not shown).

After completion of all operations, condensed water collected in the tank 109 is supplied to a separate industrial water tank, to which is added all water stored in the seal tanks provided in connection with the water jet ejectors for vacuum generation and gas cleaning. A mixture of such water in the tank is clean and neutral and may be employed as industrial water.

Additional elements of the system shown in FIG. 1 are; thermal medium locater 128 for heating the heat exchange medium, boiler 129 for supplying process steam, water tank 130 to supply water for the boiler, water tank 131 to supply cooling water for the product cooler 104 and plate condenser 108 and 108', cooling tower 132 for water in tank 131, water tank 134 to supply water to seal tank 113 and 113' and to tank 131, and freezer-cooler 133 to cool the water entering water tank 131.

While the invention has been described with reference to treating raw fish, it is to be understood that it can be employed with equally good results to other materials. Included are fish by-products from packing plants and canneries, such as fish entrails, bones, heads and the like; animal slaughter house by-products; krill caught in the Antarcitc waters; cattle dung; and vegetable matter such as grasses, seaweeds and the like.

What is claimed is:

1. A batch process for processing fish material under closed conditions to avoid the escape of foul-smelling vapors and gases in the atmosphere comprising the steps of:
    a. precooking a batch of raw fish at high temperature and pressure in the presence of high temperature and pressure steam in a treating zone with constant stirring to form precooked fish meat,
    b. reducing the pressure in the treatment zone,
    c. compressing the precooked fish meat in the treatment zone to express press water containing fish solubles, fish meat particles and oil therefrom,
    d. discharging the press water from the treatment zone,
    e. treating the discharged press water to recover oil, fish meat and stickwater containing fish solubles,
    f. after the discharge of the press water from the treatment zone, externally heating the treating zone,
    g. removing the pressure from the pre-cooked fish meat in the treating zone,
    h. drying the fish meat within the heated treating zone with stirring and under reduced pressure,
    i. removing the dried precooked fish meat from the treatment zone,
    j. removing vapors from the treating zone formed during the drying step, (h), said vapors comprising offensive gases and containing solid fish meat particles,
    k. cooling the said vapors in a condensing zone,
    l. condensing condensible gases in the vapors in the condensing zone to form an aqueous dispersion containing fish meat particles, and
    m. removing uncondensed offensive gases from the condensing zone treating the uncondensed offensive gases with chemical reagents to render them innocuous.

* * * * *